United States Patent [19]

Hier et al.

[11] Patent Number: 4,667,304

[45] Date of Patent: May 19, 1987

[54] REAL-TIME, LOCALIZED ENHANCEMENT OF A VIDEO IMAGE USING SEPARABLE TWO-DIMENSIONAL FILTERS

[75] Inventors: Richard G. Hier, San Diego; Gregory W. Schmidt, Leucadia, both of Calif.

[73] Assignee: Digivision, Inc., San Diego, Calif.

[21] Appl. No.: 674,066

[22] Filed: Nov. 23, 1984

[51] Int. Cl.[4] .......................... G06G 7/00; H04N 5/14
[52] U.S. Cl. .................................... 364/825; 364/807; 364/518; 364/812; 358/160; 358/169
[58] Field of Search ................. 358/166, 33, 169, 176, 358/171, 174, 160; 364/514, 518, 521, 724, 811, 812, 825, 807

[56] References Cited

U.S. PATENT DOCUMENTS

| | | | |
|---|---|---|---|
| 4,057,828 | 11/1977 | Monahan | 358/169 X |
| 4,081,838 | 3/1978 | Wheeler | 358/169 |
| 4,187,519 | 2/1980 | Vitols et al. | 358/169 |
| 4,506,292 | 3/1985 | Newton et al. | 358/166 X |

OTHER PUBLICATIONS

"Local Adaptive Enhancement: A General Discussion and Fast Implementations" by E. C. Driscoll, Jr. and C. Walker, 1983, Machine Processing of Remotely Sensed Data Symposium, pp. 266-271.

"Active RC and Switched Capacitor" by M. S. Ghausi and K. R. Laker, Modern Filter Design, pp. 76-81, 221-226.

"Real-Time Adaptive Contrast Enhancement" by P. M. Narenda and R. C. Fitch, IEEE Transactions on Pattern Analysis and Machine Intelligence, vol. PAMI-3, No. 6, Nov. 1981, pp. 655-661.

Primary Examiner—Gary V. Harkcom
Attorney, Agent, or Firm—Brown, Martin, Haller & Meador

[57] ABSTRACT

A video signal producing a raster-scanned image is processed in real time to enhance high frequency characteristics of the image generated by the signal, with the enhancement performed according to a local adaptive process implemented in an apparatus including one or more two-dimensional higher-order filters. Each filter provides a signal corresponding to a statistical measure of the raster image at a point in the image centered in a local area. In each case, the measure is a function of characteristics of the image within the centered area. Each filter is synchronized with the video signal to provide its respective statistical signal substantially in real time and in phase with the input video signal.

6 Claims, 7 Drawing Figures

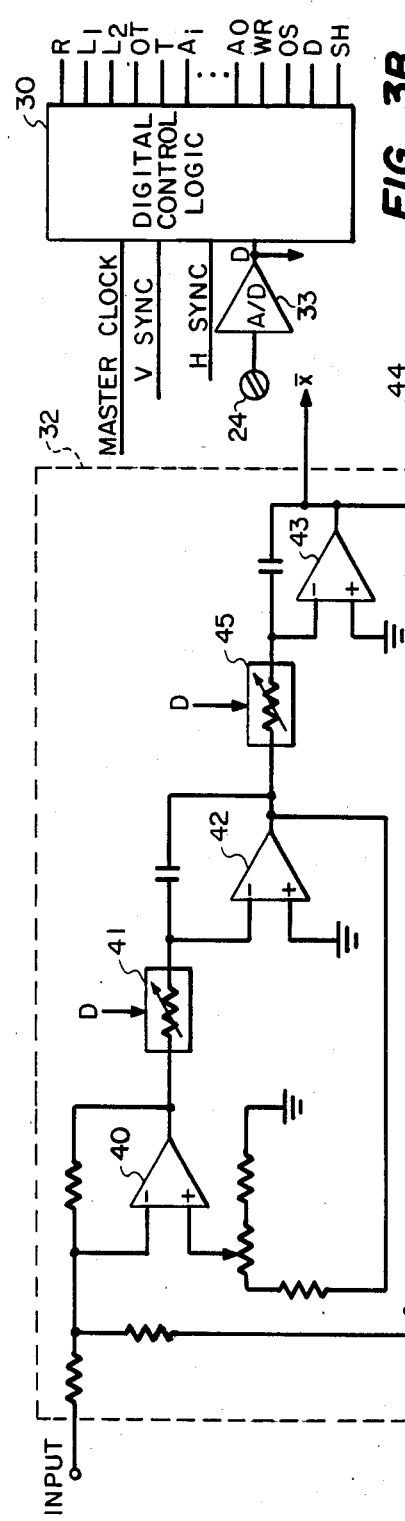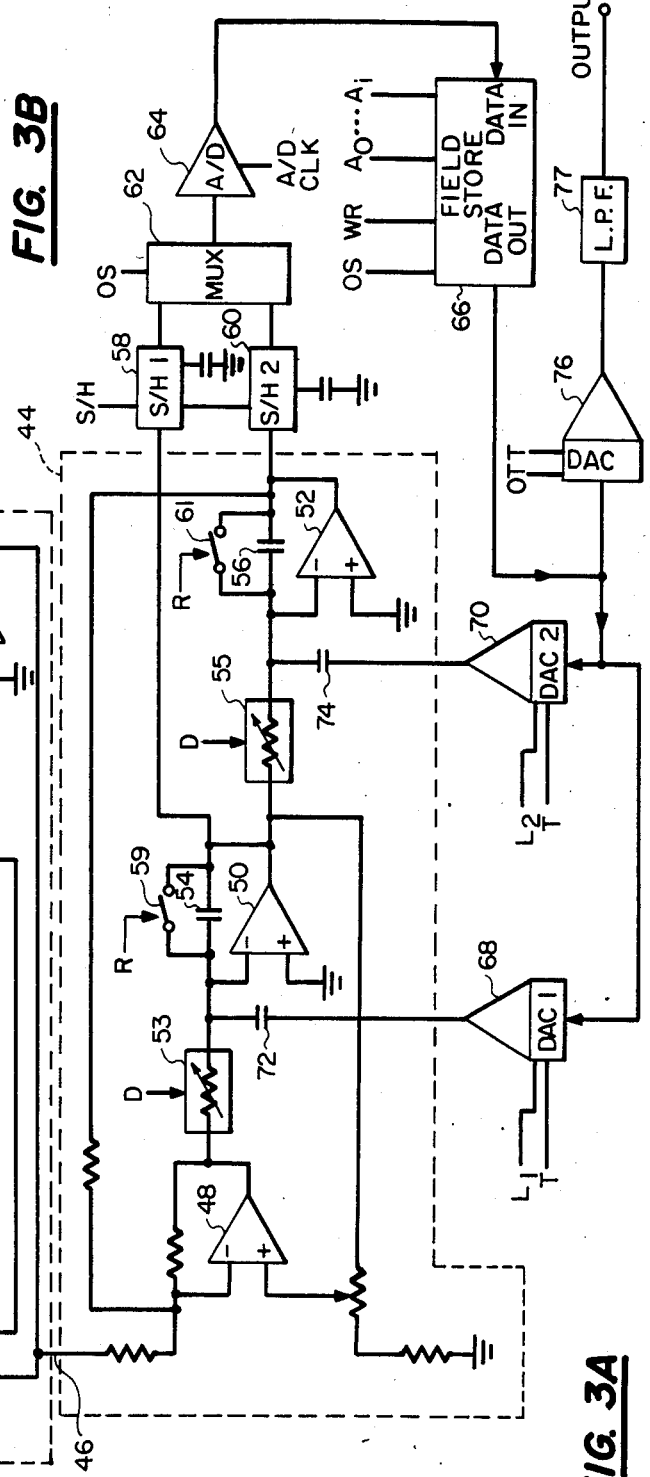
FIG. 3B
FIG. 3A

REAL-TIME, LOCALIZED ENHANCEMENT OF A VIDEO IMAGE USING SEPARABLE TWO-DIMENSIONAL FILTERS

BACKGROUND OF THE INVENTION

This invention relates to real-time processing of a raster-producing video signal by the use of statistics of the signal that corresponds to a local segment of the raster image.

The quality of display of an image in a video system can be degraded by extraneous video information in the form of, for example, shading variations that result from non-uniform illumination of the scene being imaged.

Such background noise of the scene adds a low frequency component to the video signal and increases the signal's dynamic range. If the video signal dynamic range exceeds the dynamic range of the display apparatus to which it is fed, low contrast image details can be lost.

One approach to removing the contribution of low-frequency noise to the dynamic range of video signal in order to permit the display of low contrast local scene details is to subject the video signal to a conventional local area contrast enhancement procedure that reduces the effect on dynamic range of such noise. Known procedures of this type enhance the contrast in a local area based on statistics derived from image characteristics in the area.

One example of localized adaptive enhancement is found in an article entitled "Local Adaptive Enhancement: A General Discussion In Fast Implementations" by E. C. Driscoll Et Al printed in the Proceedings of the 1983 Machine Processing Of Remotely Sensed Data Symposium. An approach to implementing a local area contrast enhancement algorithm in real time is found in "Real-Time Adaptive Contrast Enhancement," P. M. Narendra Et Al, IEEE TRANSACTIONS ON PATTERN ANALYSIS AND MACHINE INTELLIGENCE, Vol. PAMI-3, No. 6, November 1981.

In the Narendra apparatus, the statistical calculation of image area signal is performed by a separable two-dimensional low-pass filter. The filter consists of a conventional first filter section for filtering in the horizontal direction. The horizontal filter section is in series with a recursive first-order filter that filters in the vertical direction. Consequently, a spatial phase delay results between the image produced by the video signal and the signal output by the filters. As a result, the statistics at a point in the image scene area that is evaluated by the filter is based only on an asymmetric localized area that approaches but does not surround the point. Therefore, the calculated statistic does not account for image scene characteristics for the rest of the localized area around the point.

Therefore, to provide further enhancement of a video image that is processed in a local-area statistical manner, it would be advantageous to calculate the statistics for points in the scene from the variations in more symmetric, localized image areas that contain the points. This would result in calculation of statistical values more representative of image characteristics in the neighborhood of an image point, which, when used in a localized enhancement process, will produce a more desirable image.

It is therefore an objective of the present invention to provide an apparatus that performs a real-time, localized enhancement of a video image using image statistics for points in the video image that are derived from localized areas of the image surrounding the points.

It is a further object of the present invention to provide an improved separable, two-dimensional, higher-order filter for real-time processing of raster signals without introducing spatial phase delays between the data to be processed and the resulting processed data.

It is a still further object of the present invention to provide an improved apparatus performing a local-area contrast enhancement of video images.

SUMMARY OF THE INVENTION

The present invention overcomes the limitations of the prior art local area enhancement apparatus and achieves the stated objectives by provision of a separable two-dimensional filter having higher-order, state variable horizontal and vertical filters that cooperate to calculate statistics at a point in a scene image that is based upon variations in the scene measured within a scene area containing the point. The separable filter also adjusts the phase of the resultant statistical signal to substantially align it with the phase of a video signal producing the scene.

The apparatus of the invention is responsive to an input video signal producing a raster-scanned image for providing an output video signal with improved image contrast. The apparatus includes a processor section that responds to the input video signal and to one or more signals representative of a statistical value of the input video signal by combining the input signal and the statistical value signals to produce the improved output video signal.

The processing section obtains the statistical value signal from a higher-order filter section that responds to the input video signal by producing a statistical signal based upon characteristics in the input signal occurring within a determinable area of the raster produced by the input signal.

Finally, the apparatus includes a phase adjustment section coupled between the processing and filter sections that adjusts the phase of the statistical signal to align it with the phase of the input video signal and provides the phase-adjusted statistical signal to the processing section.

It will become evident when the detailed description of the preferred embodiment is read in light of the below-described drawings that the apparatus of the invention provides objectives and advantages other than those described above.

BRIEF DESCRIPTION OF THE DRAWINGS

FIG. 3A is a schematic diagram illustrating the preferred hardware implementation of a separable, two-dimensional filter used in the apparatus of the invention.

FIG. 3B is a block diagram of digital control logic used to control the operations of the filters exemplified by FIG. 3A.

DETAILED DESCRIPTION OF THE PREFERRED EMBODIMENT

Figure 1:
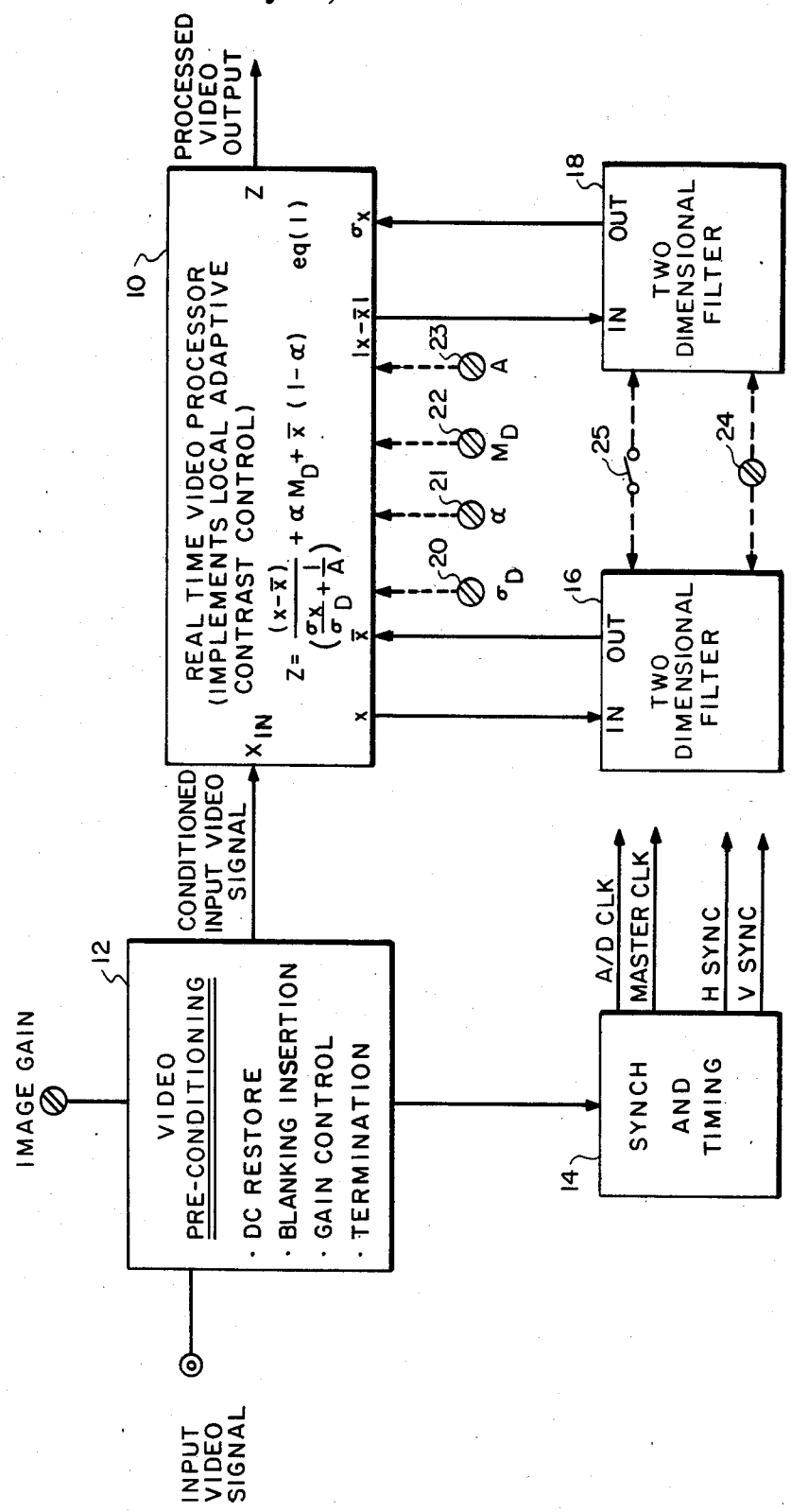
FIG. 1 is a block diagram illustrating the apparatus of the invention used to implement a local adaptive contrast enhancement process on an input video signal that produces a raster-scanned video image.

The apparatus of the invention is illustrated in FIG. 1. The input to the apparatus consists of a standard RS-170 video signal that is produced by a video output device such as a vidicon, laser disc, or video cassette recorder. As is known, the RS-170 signal can be fed directly to a standard video monitor with a CRT screen upon which an electron beam modulated by the input video signal will generate a raster-scanned image. The beam is conventionally moved across the screen from left to right to trace a horizontal line, with a quick return to the left again, and from the top downward in subsequent lines. At the bottom of the screen, the electron beam will be returned to the top left corner, in a process that is repeated. Conventionally the movement of the beam in the scanned format traces out a rectangular pattern called a raster. The movement of the beam is referred to as raster-scanning.

The video standard followed in the United States provides 525 raster lines displayed at 30 raster frames per second, each frame consisting of two interlaced fields of 262.5 lines, fields being displayed at 60 times a second.

The invention described in this specification utilizes a novel hardware structure for enhancing, in real time, the quality of images produced when the electron beam is modulated by an input video signal. The term "real time" means, for example, that the present invention is able to keep pace with a standard video input signal without loss of signal and to concurrently exhibit live video images in the same fashion as a conventional television set, while also greatly enhancing the quality of the displayed image. The applicant's invention employs both digital and analog processing to enhance, for example, the contrast of the displayed image.

Conventional algorithms are known that can be embodied in electronic hardware to process standard video signals in real time. One such algorithm describes a process for local adaptive contrast control of a video image. This algorithm is illustrated in FIG. 1 as eq (1) (corresponding to equation (1)). In equation (1), Z is a processed output video signal with enhanced contrast resulting from the subjection of an input video signal X to the adaptive algorithm; $\overline{X}$ is the mean of X at a point contained in a localized area of the video image produced by X; $M_D$ is a predetermined mean brightness; $\sigma_X$ is the standard deviation of X within a localized area; $\sigma_D$ is a desired standard deviation; and sets the level of desired background bias in the video image.

The algorithm of equation (1) can be implemented in hardware by a reasonably skilled analog circuit engineer having experience in the design of video analog processing circuits, given $\overline{X}$ and $\sigma_X$ as inputs. In the preferred embodiment, the hardware-implemented algorithm of equation (1) is embodied in a real time video processor block 10.

The input signal $X_{in}$ that is provided to the processor block 10 is provided by a video preconditioning block 12 that accepts an input video signal from any standard video signal source and preconditions the signal. Such preconditioning can include, for example, a DC restore operation, that imposes a DC reference for digital processing. The pre-conditioning can also include blanking insertion that consists of inserting an artificial voltage level during the video signal blanking interval, gain control, and termination impedance matching.

The preconditioned video signal is fed to the processor block 10 which implements the algorithm of equation (1) to process intensity variations in the image represented by the video signal in order to sharpen the image contrast and highlight image details. Effectively, the algorithm accomplishes these objectives by removing unwanted portions of background components from the signal, such as low frequency variation resulting, for example, from non-optimum illumination of the scene which is to be displayed. The algorithm then stretches contrast in local areas of the image to some desired value.

A standard synch stripper and timing circuit 14 senses horizontal and vertical synchronization components in the input video signal and employs standard timing and synchronization circuitry to produce a signal VSYNC representing the vertical synchronization that signals the beginning of a video field. The synch stripper 14 also provides a signal HSYNC, indicating the beginning of a horizontally-swept line. Also provided are a signal A/D CLK that clocks conversion components and a MASTER CLK signal to clock and synchronize various operations in the apparatus of the invention.

The variables necessary to perform the algorithm embodied in the processor block 10 are all input to the block as voltage signals. The variables $\overline{X}$ and $\sigma_X$ are derived from a pair of two-dimensional, programmable, low-pass filters 16 and 18 that are described in greater detail below. The other variables $\sigma_D$, $\alpha$, $M_D$, and A are derived from the outputs of variable DC voltage sources, not shown, that are adjusted by adjustment mechanisms 20, 21, 22, and 23. The voltage sources 20–23 can comprise, for example, potentiometers connected to a common DC source.

Both of the filters 16 and 18 are higher-order filters. That is, they both implement filter functions having an order of two or more.

The processor block 10 provides, as output signals, the pre-conditioned video input signal X and the absolute difference between X and $\overline{X}$ to the filters 16 and 18, respectively. These variables are preferably in the form of voltage signals that are input to the filters. In addition, another variable voltage source, not shown, but adjusted by the adjustment mechanism 24 provides an input signal to both filters 16 and 18 that determines the bandwidth of the filter in a manner described below. Finally, a conventional single-pole, single-throw switch 25 provides a freeze-frame signal to both of the filters 16 and 18 that produces an effect described below.

Figure 2:
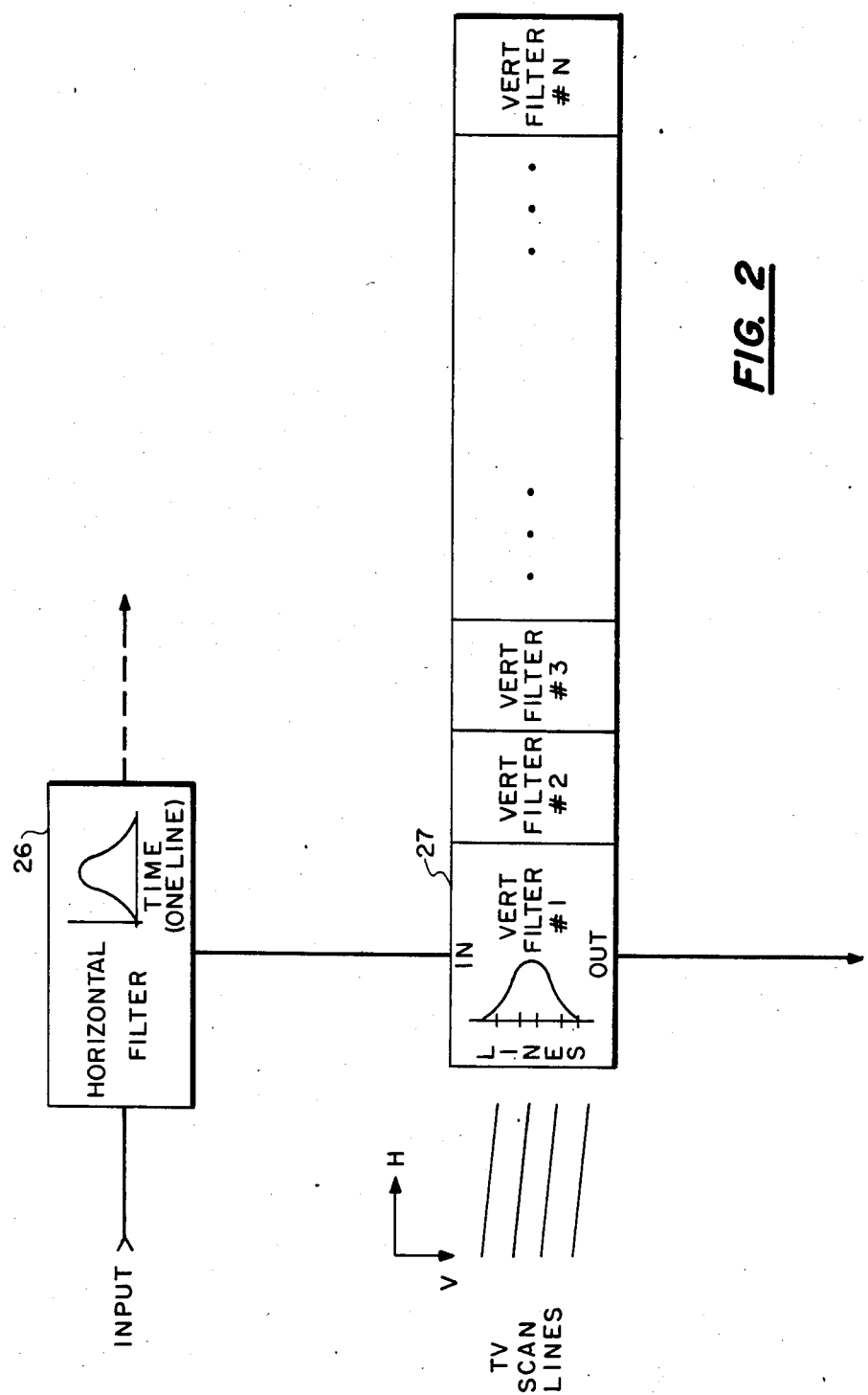
FIG. 2 illustrates how the separable two-dimensional filter of the invention operates across a representative horizontal line of video in the raster produced by the input video signal of FIG. 1.

The operation of each of the filters 16 and 18 is illustrated conceptually in FIG. 2. As is known, computation of the local weighted mean $\overline{X}$ and the approximate local weighted standard deviation $\sigma_X$ can be implemented by low pass filtration of $\overline{X}$ and the absolute value of $X-\overline{X}$, respectively. Since the computation of these statistical values is to be performed over a localized area, the filtration is two-dimensional. That is, filtration must be implemented in both the horizontal and the vertical direction over the desired area. Two dimensional filtration is illustrated in FIG. 2 where an input (which can be either $\overline{X}$ or the absolute value of $X - \overline{X}$) is input to a horizontal low-pass filter that filters each line of video produced by the input video signal. In series with the horizontal filter is an array of a number of vertical filters, one indicated by 27, that perform filtration in the vertical direction of the input signal. Preferably, there is a sufficient quantity of vertical filters to meet Nyquist sampling requirements on the horizontally-filtered signal. Each of the vertical filters has an effective bandwidth such that the filter response spans a plurality of scan lines. Further, the bandwidths of both the horizontal and vertical filters can be adjusted down from these limits established by sampling requirements to provide larger effective local areas over which the statistical values are computed.

Thus, conceptually, each line of the raster image produced by the input video signal and filtered by the horizontal filter 26 can be considered to be separated into N consecutive vertical filter (VF) segments. Each VF segment of each line is processed by the respective vertical filter 27 defining the segment. The processing time for each segment is determined by the composite bandwidth of the two filters.

FIG. 3A illustrates the preferred structure of both FIG. 1 filters 16 and 18. The filters 16 and 18 are controlled by digital control logic 30 illustrated in FIG. 3B and including, preferably, a programmable logic array (PLA) that receives the MASTER CLK, HSYNC, and VSYNC signals. In addition, the output of the variable voltage source adjusted by mechanism 24 is fed in digital form to the logic circuit 30 through a conventional analog-to-digital (A/D) converter 33 that produces a digital signal D which consists of a code corresponding to the DC signal level provided to the converter's input. The digital control logic 30 produces, among others, the following representative signals that are useful for controlling the operation of the filters: reset (R); latch ($L_1$ and $L_2$); output transfer (OT); state-variable transfer (T); address ($A_0 - A_i$); write (WR); output select (OS); and sample (S/H).

The filter of FIG. 3A includes a higher-order horizontal filter section 32 that receives an input signal (either $\overline{X}$ or the absolute value of $X - \overline{X}$). In the preferred embodiment, the horizontal filter 32 comprises a conventional second-order, active, state-variable filter including an input summing amplifier 40, a first integrating amplifier 42, and a second integrating amplifier 43. The bandwidth of each of the integrating amplifiers 42 and 43 is set by the RC time constant established by the resistance and capacitance coupled to its inverting input port. Each of the bandwidths can be adjusted by adjustment of a respective one of the digitally-controlled resistors 44 and 45. The digital signal controlling the digital resistors 41 and 45 is the control signal D. The control signal D is taken from the output of the A/D converter 33 and is, therefore, set by the adjustment of the variable voltage source controlled by the mechanism 24.

The filter of FIG. 3A also includes a vertical filter section 44 that processes the filtered output from the horizontal filter 32 available on the signal line 46. The vertical filter section 44 includes a second second-order, low-pass, state-variable filter including a summing amplifier 48 and integrating amplifiers 50 and 52. The bandwidth of the integrating amplifier 50 is set by the RC product of the digitally-controlled resistor 53 and the integrating capacitor 54. Similarly, the bandwidth of the integrating amplifier 52 is set by the digitally-controlled resistor 55 and the integrating capacitor 56.

The filter of FIG. 3A also includes a first conventional sample and hold (S/H) circuit 58 connected to sample the voltage on the integrating capacitor 54. A reset switch 59 is closed after the operation of the S/H circuit 58 to discharge the integrating capacitor 54. Similarly, a S/H circuit 60 samples the voltage on the integrating capacitor 56, which is thereafter discharged by closure of a reset switch 61. The sampled voltage values held on the S/H circuits 58 and 60 are fed separately through a multiplexer 62 to an A/D converter 64. The digitized output from the converter 64 is fed to the input data port (DATA IN) of a field storage device 66. The output port of the field storage device 66 feeds a pair of digital-to-analog converters (DAC) 68 and 70. The DAC 68 is connected through an injection capacitor 72 to charge the integrating capacitor 54 to an initial voltage representing one state variable of a second order filter function implemented by the filter section 44. Similarly, the output of the DAC 70 is fed through an injection capacitor 74 to charge the integrating capacitor 56 to another initial voltage representing another state variable of the second order filter function implemented by the filter section 44.

The state variable voltages on the capacitors 54 and 56 are changed N times during each line of video. This effectively provides the N vertical filters illustrated in FIG. 2, since the sampling and storage of the voltages on the capacitors 54 and 56 permits each state variable to be stored and used again to establish a filter function at the corresponding image point and display time in the line following the present one.

The DATA OUT port of the field storage device 66 is also connected to a DAC 76 whose output is fed through a conventional low-pass reconstruction filter 77. The output of the low-pass filter 77 is provided as the output of the filter.

In operation, an input signal is fed into the filter of FIG. 3A and is processed initially by the horizontal filter 32 which provides its filtered output on signal line 46 to the vertical filter section 44. Then, the N effective vertical filters are successively switched into series with the filter signal by periodically changing the filter state variables of the vertical filter section 44 by charging the integrating capacitors 54 and 56 to initial states. Thus, the vertical filter section is time-division-multiplexed in such a way as to appear as N distinct vertical filters.

Figure 4:
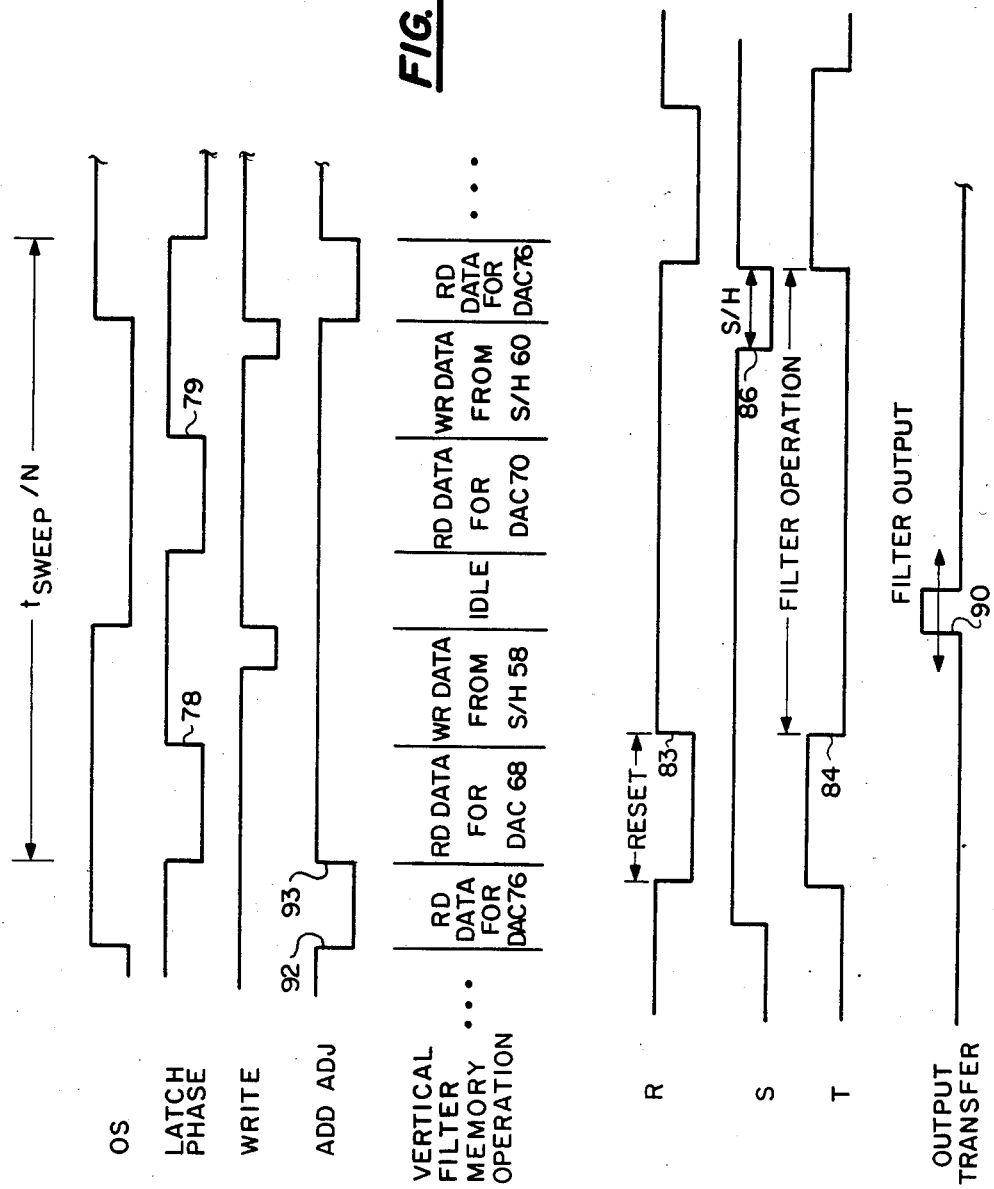
FIG. 4 is a timing diagram illustrating the sequential operation of the filter of FIG. 3.

The sequence of operations necessary to save and restore the state variable voltages on the vertical filter section of FIG. 3A is illustrated by the waveforms of FIG. 4. It will be recalled that the state variables of the vertical filter section 44 are initialized N times for each horizontal line on the image raster to provide N vertical filters that are all sequentially accessed once each horizontal raster line.

The effective operating time of any one of the N vertical filters (vertical filter operation time) is $t_{sweep}/N$, where $t_{sweep}$ is the time required to sweep one horizontal line of video and N is the number of times the vertical filter section 44 has its state variables changed. During the operation time for a vertical filter, the digital control logic 30 provides a control signal OS to the multiplexer 62 that enables the multiplexer to select the held value output by either of the S/H circuits 58 or 60. Preferably, when OS is high, the output of the S/H circuit 60 is selected; when OS is low, circuit 58 is selected. When either of the S/H circuits is selected, the held value is provided to the A/D converter 64, with the converted value being stored in the field storage device 66 at a storage address, described below, when the WR signal transitions to a low state.

Interlaced with the write operations are read operations that obtain stored state variable voltage values from the field storage device 66 and provide them through the DAC's 68 and 70 to charge the integrating capacitors 54 and 56. A read operation is effected whenever the WR signal is high and an address is provided to the field storage device 66. Each of the DAC's 68 and 70 has an associated latch, not shown, that receives data from the field storage device 66. The signal $L_1$ latches data from the storage device 66 to latch of DAC 68, while the signal $L_2$ latches data to the DAC 70. The addressed state variable data that is staged to the DAC's 68 and 70 through their associated latches is held in the latches until their outputs are made available to the DAC's 68 and 70, which permits the charging of the integrating capacitors 54 and 56, and thereby the setting of the state variables of the ith vertical filter. The phasing of the latch operations is indicated by an address-/latch control (A/L CNTRL) generated internally by the digital control logic 30; the signal is illustrated in FIG. 4. During the rising edge 78, $L_2$ is generated, and on the rising edge 79, $L_1$ is generated.

The sequence of memory operations required of the field storage device 66 in the initialization and sampling of the jth vertical filter are indicated in FIG. 4. Preferably, first, data is read from the device 66 and latched for the DAC 70 with the edge 78 of the A/L CNTRL signal. Next, the data held in the S/H circuit 60 is written to storage when the WR signal goes low following the edge 78. An idle state follows. Then, data is read into the latch for DAC 68, followed by writing of data to storage from S/H circuit 58. Then, filter output data for DAC 76 is read from the field storage device 66.

Figure 5:
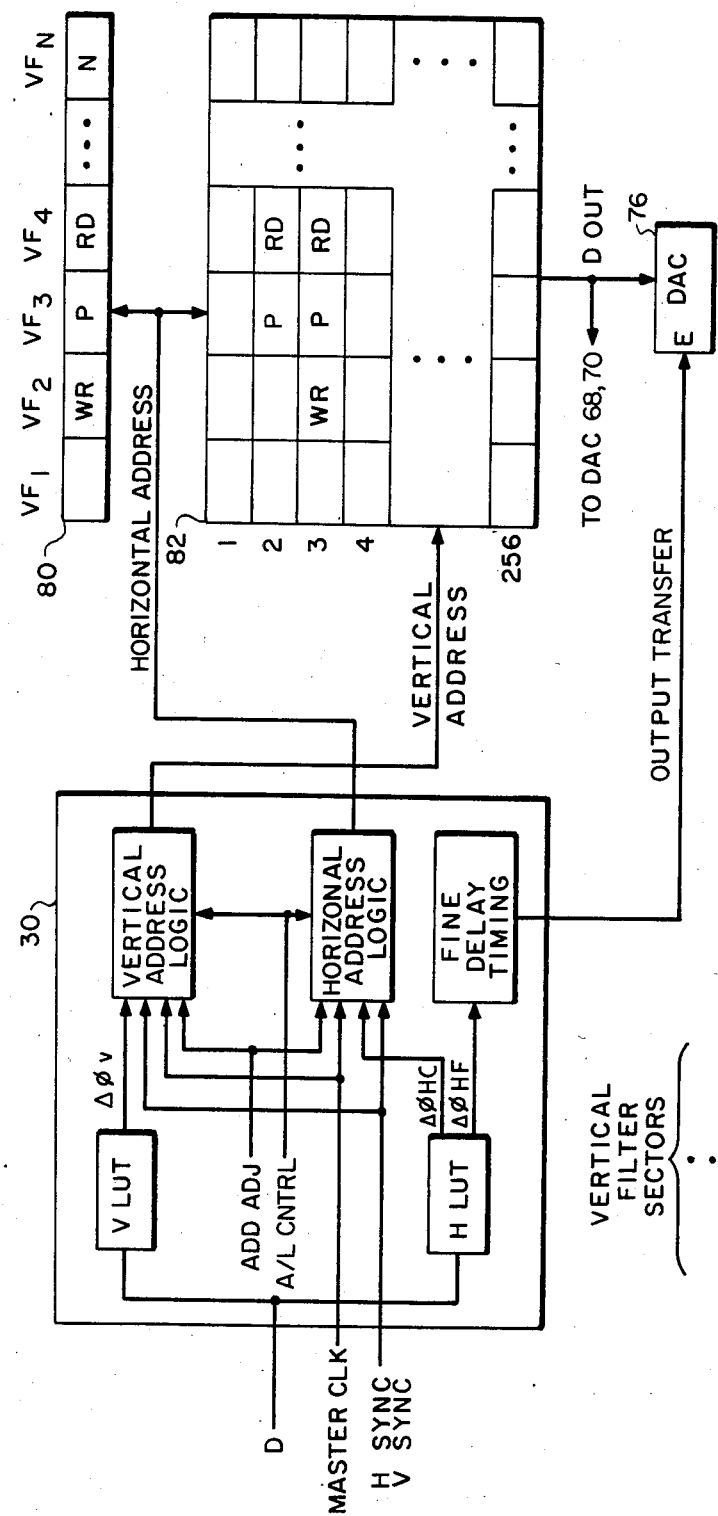
FIG. 5 illustrates the memory organization of the field storage device of the FIG. 3 filter and its manipulation by associated elements.

Referance to FIG. 5 further illustrates the sequence of operations involved in setting and storing state variable voltage values for the vertical filter section 44. A pair of memory sector maps 80 and 82 signify respective sectors of addressable memory space in the field storage device 66. The memory map 80 constitutes N sequentially-addressable storage locations, each for the storage of a state variable voltage value provided to the integrating capacitor 54. The memory map 82 has a two-dimensional 256XN matrix of addressable locations, each storing a state variable voltage value for the integrating capacitor 56. It should be evident that each horizontal address supplied to the matrix memory map 82 and to the unidimensional memory map 80 corresponds to one of the vertical filters (VF). Each vertical address provided to access the memory map 82 corresponds to one of 256 video lines which, as known, are sufficient to form the active portion of a raster field.

Thus if, for example, the filter of FIG. 3A is processing an image point contained in an image portion corresponding to the third vertical filter sector of line 3, it will have been initially configured by charging the capacitor 54 to a voltage corresponding to the state variable value stored at address $VF_3$ in the memory sector 80 and the capacitor 56 to a voltage value stored at the memory location addressed by the combination of vertical address 2 and horizontal address $VF_3$ in memory sector 82. Moreover, while the vertical filter section 44 is operating with these initial state variable values indicated by a P in FIG. 5, the processed state variable samples from its previous configuration ($VF_2$) will be written into the respective memory spaces indicated by WR, while the state variables stored in the subsequent adjacent memory spaces corresponding to $VF_4$ (indicated by RD in FIG. 5) will be provided to the latches associated with the DAC's 68 and 70.

Returning to FIG. 4, the sequence of resetting and sampling operations necessary to sample and clear the integrating capacitors 54 and 56 are illustrated. Immediately prior to the beginning of the operation time for the jth vertical filter, a reset R signal is provided to operate the reset switches 59 and 61, discharging the capacitors 54 and 56. At the same time, the DAC's 68 and 70 are held at a reset value. Following the reset period indicated in the R signal waveform of FIG. 4, the switches 59 and 61 are opened when the R signal is rising at edge 83. Next, the first falling edge 84 of a transfer T signal permits the state variable voltage values held in their associated latches to be transferred to the DAC's 68 and 70. This permits the state variable voltages to be applied to the capacitors 54 and 56 and causes the filter section 44 to begin operation as the jth vertical filter. This is indicated by the section of the transfer T waveform labelled "filter operation".

Toward the end of the jth filter operation period, the state variable voltage values in the capacitors 54 and 56 will be sampled and held in the S/H circuits 58 and 60, respectively. This occurs when the sample S waveform assumes the low state following signal transition 86.

Referring once again to FIG. 3A, it can be appreciated that the jth state variable voltage on the integrating capacitor 56 also represents the output of the jth vertical filter. However, as is known, both the horizontal and vertical filter sections introduce respective phase delays into the output signal available on the capacitor 56 that impose a phase difference between the input signal being processed and the resultant processed output. The delay can be understood conceptually with reference to FIG. 6.

Figure 6:
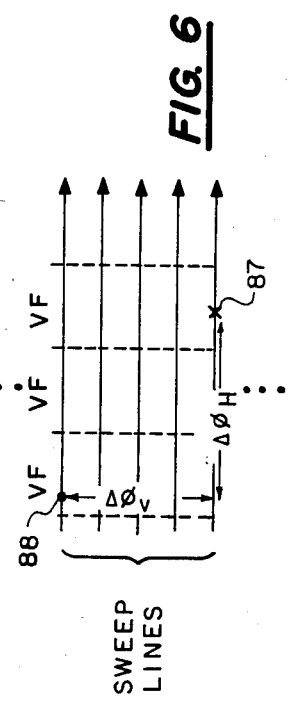
FIG. 6 is an illustration of a localized segment of the raster produced by the video signal of FIG. 1 that demonstrates how the statistical signal produced by the FIG. 3 separable filter is aligned in phase with the input video signal of FIG. 1.

FIG. 6 illustrates a magnified portion of a field of video produced by the processed video output signal Z of FIG. 1. Reference numeral 87 marks an image element of a line corresponding to the present state of the input video signal X. A composite delay, indicated by reference numeral 88, is introduced by the filter sections 32 and 44, and includes a horizontal phase component ($\Delta\phi_H$) and a vertical phase component ($\Delta\phi_V$).

In the apparatus of the invention the horizontal phase delay is treated as a coarse measure corresponding to a number of VF operating periods and a fine portion corresponding to a time that is less than one of the VF operating periods. The vertical delay is treated as a number of scan lines in a field. In order to reregister a processed output ($\overline{X}$ or $\sigma_X$) to be spatially in phase with the input video signal, the processed output is not provided to the real time video processor 10 until the following field. Thus, if, after supplying the jth state variable voltages on the vertical filter section 44, the vertical address is offset by a number of lines corresponding to the vertical delay, while the horizontal address is offset by a number of VF segments corresponding to the coarse portion of the horizontal delay, a value will be obtained from the memory storage sector 82 that is out of phase with respect to the present input signal only by the value of the fine portion of the horizontal delay. This fine horizontal delay portion can be used to offset the provision of the filter output by an amount required to bring the output signal substantially into phase with the input signal. This is illustrated by the OUTPUT TRANSFER (OT) waveform of FIG. 4 where the filter output is provided to the DAC 76 after the vertical and horizontal offsets have been made to the respective addresses of the memory sector 82 to obtain the correct filter output. The new filter output is provided to the DAC 76 on the positive edge 90 of the OUTPUT TRANSFER signal, which is adjusted by the digital control logic 30 to offset the filter output by an amount to compensate for the fine portion of the horizontal delay.

The structure of the apparatus of the invention that performs the phase adjustment of the output provided by the FIG. 3A filter is illustrated in FIG. 5. The digital control logic 30 can include programmable and memory circuits that permit implementation of a vertical lookup table (VLUT) and a horizontal lookup table (HLUT) that respond to the adjustment signal D provided to the digitally-controlled resistors 41, 45, 53, and 55. The range of digital values over which the signal D can be adjusted constitutes an address signal input to the two lookup tables. Since the adjustment signal D establishes the complex impedance of the horizontal and vertical filter sections, it can be transformed into a value of phase delay for any impedance setting it establishes. Thus, the lookup tables store, at each addressable location, the number of lines or VF sectors corresponding to the vertical and horizontal phase delays resulting from the value of the adjustment signal D defining the address for that sector.

The vertical phase offset in number of lines is fed to a vertical address logic section, while the coarse horizontal phase offset in number of VF sectors is fed to a horizontal address logic section. The vertical and horizontal addresses used to obtain the state variable voltage value for the capacitor 56 that is associated with the current VF segment are offset from the horizontal and vertical addresses provided to the memory sector 82 and the state variable voltage value stored at the location corresponding to the offset address values is provided to a latch, not shown, associated with the DAC 76.

The fine horizontal adjustment that is obtained from the currently-addressed horizontal lookup table location is fed to a fine delay timing section of the digital control logic 30 to provide the output transfer signal illustrated in FIG. 4, which enables the DAC 76 to provide the output at precisely the point of time in the current VF sector that will align the phase of the output signal with that of the input video signal of FIG. 1. This insures proper phasing between the statistical signal provided by the filter of FIG. 3A and the video signal of FIG. 1.

Returning to FIG. 4, the sequence of memory operations associated with provision of an output statistical signal through the DAC 76 with the vertical filter memory operations of the FIG. 3A circuit can be better understood. To synchronize the output memory operations with the vertical filter memory operations, an address adjustment signal ADD ADJ that is generated internally in the digital logic 30 transitions before the beginning of the jth VF sector to a negative state at reference numeral 92 which signals the horizontal and vertical address logic segments of the digital control logic 30 to provide the offset horizontal and vertical addresses to obtain the required filter output value from the memory sector 82. This data is provided to the latch, not shown, associated with the DAC 76 so that at the next positive transition of the OUTPUT TRANS-FER signal 90, the DAC 76 will produce the proper output signal. Then, the address adjustment signal rises at 93 in order to change from the addresses indicating the storage location for the output to those indicating the location of the state variables to be provided next.

In some applications, it may be useful to store the contents of the memory sectors 80 and 82 as unvarying masks after the filter of FIG. 3A has operated for a period of time. In this case, the switch 25 is closed. Closure of the switch 25 causes the digital control logic 30 to lock the WR signal into an unvarying high state. This keeps the state variable voltage values in memory sectors 80 and 82 from being changed. Thus, as the filter operates, the field of values output by the filter of FIG. 3A through the DAC 76 will be "frozen".

Of course, since the field storage unit 66 stores fields in a filtered state, the number of cells in such a unit is reduced greatly in comparison to full resolution field stores. It therefore becomes much more practical to store a large number of mask fields to be used in processing various input images in, for example, a cyclical fashion.

Although the above-described embodiment has been presented as performing second order, two-dimensional filtration, it should be evident that it could be extended to perform higher-order filtration in more than two dimensions. Further, it would be possible to implement the embodiment using other mixtures of analog and digital techniques than those illustrated.

Obviously many modifications and variations of the present invention can be made in light of the above teachings. However it is to be understood that within the scope of the appended claims the invention may be practiced other than as specifically described.

We claim:

1. A video processing apparatus for enhancing presentation characteristics of a raster-scanned image signal, comprising:

processing means responsive to an input signal representative of a raster-scanned image and to a statistical signal representative of a statistical value of said input signal for combining said input signal and said statistical signal to produce an output signal representing an enhancement of said raster-scanned image by increasing the contrast in the image;

plural-order filter means responsive to said input signal and to a filter variable signal for producing said statistical signal during a first image raster field defined by said input signal, said statistical signal produced by two-dimensional filtration of said input signal within a horizontal filter bandwidth and a vertical filter bandwidth, at least one of said filter bandwidths being determined by said filter variable signal; and phase adjustment means coupled between said processing means and said plural-order filter means for adjusting the phase of said statistical signal to substantially equal the phase of said input signal by producing said filter variable signal based upon two-dimensional filtration of a second image raster field defined by said input signal, said second image raster field corresponding to, but preceding, said first image raster field.

2. An apparatus for providing, for a time-varying input signal producing a raster-scanned image, a multidimensionally-filtered output signal, comprising:

a first higher-order filter means, responsive to said input signal, for producing a dimensionally filtered signal representative of the subjection of said input signal to at least a first filter function having a first filter bandwidth;

means for providing plural value signals, each corresponding to the value of one of a set of state variables;

a second higher-order filter means responsive to said value signals and to said dimensionally-filtered signal for subjecting said dimensionally-filtered signal to a second filter function having a second filter bandwidth to produce a multidimensionally-filtered output signal representative of the subjection of said input signal to said first and second filter functions; and means responsive to said first and second filter bandwidths for adjusting the phase of said multidimensionally-filtered output signal to substantially align the output signal spatial phase with the spatial phase of said input signal.

3. An apparatus responsive to an input signal representing a raster-scanned image for providing an output signal representing said image with increased contrast characteristics, comprising:

adaptive processor means responsive to said input signal and to a mean value signal indicative of the mean value of said input signal at a point contained in a localized portion of the image represented by said input signal for producing a difference signal representative of a difference between said input and mean value signals;

signal processing means in said adaptive processor means responsive to said input signal, to said mean value signal, and to a variance signal representing the standard deviation of said input signal over said localized image portion for producing an output signal representing said image by increasing the contrast in said image to a selected value; and multidimensional filter means responsive to said input signal and to said difference signal for producing said mean value signal and said variance signal, said multidimensional filter means including:

horizontal means responsive to said input signal for performing horizontal low pass filtration within a horizontal filtration bandwidth of a horizontal portion of said image, and vertical means, responsive to said horizontal low pass filtration for performing vertical low pass filtration within a vertical filtration bandwidth of each of a series of vertical portions of said image taken along said horizontal portion, said vertical means providing a filter signal representative of said vertical low pass filtration;

adjustment means for selectively adjusting said vertical bandwidth; and field means responsive to said filter signal for producing said means value signal and for aligning the phase of said mean value signal with the phase of said input signal based upon said adjusting.

4. The apparatus of claim 3 wherein said vertical means includes a state variable filter having an order of two or more and said multidimensional filter means further includes state setting means for setting the state variables of said state variable filter for each of said series of vertical portions.

5. The apparatus of claim 4 wherein said state variable filter includes a pair of serially connected integrating circuits, each having an integrating capacitor and said state setting circuit includes means for setting each of said integrating capacitors to an initial voltage corresponding to a respective state variable.

6. The apparatus of claim 3 wherein said field means includes a field storage means for sampling said filter signal during the vertical filtration of each of said vertical portions and for storing an array of filter signal samples corresponding to a field of said image and addressing means responsive to said input signal and to said adjustment means for obtaining from said field means the stored filter signal samples for a stored field of said image in synchronism with said input signal by advancing from a first location in said array where a sample is being stored to a second location in said array offset from said first location by a distance corresponding to said horizontal and vertical bandwidths.

* * * * *